(12) United States Patent
Sofin

(10) Patent No.: US 11,498,841 B2
(45) Date of Patent: Nov. 15, 2022

(54) METHOD FOR PRODUCING HIGHLY DISPERSED SILICON DIOXIDE

(71) Applicant: WACKER CHEMIE AG, Munich (DE)

(72) Inventor: Mikhail Sofin, Burghausen (DE)

(73) Assignee: WACKER CHEMIE AG, Munich (DE)

(*) Notice: Subject to any disclaimer, the term of this patent is extended or adjusted under 35 U.S.C. 154(b) by 292 days.

(21) Appl. No.: 16/630,608

(22) PCT Filed: Jul. 13, 2017

(86) PCT No.: PCT/EP2017/067720
§ 371 (c)(1),
(2) Date: Jan. 13, 2020

(87) PCT Pub. No.: WO2019/011435
PCT Pub. Date: Jan. 17, 2019

(65) Prior Publication Data
US 2021/0147245 A1 May 20, 2021

(51) Int. Cl.
*C01B 33/18* (2006.01)
*C08K 3/34* (2006.01)
*C01B 33/12* (2006.01)

(52) U.S. Cl.
CPC .......... *C01B 33/183* (2013.01); *C01B 33/12* (2013.01); *C01P 2006/12* (2013.01); *C08K 3/34* (2013.01)

(58) Field of Classification Search
None
See application file for complete search history.

(56) References Cited

U.S. PATENT DOCUMENTS

| 4,108,964 A | 8/1978 | Kratel et al. |
| 2002/0041963 A1 | 4/2002 | Konya et al. |
| 2002/0048063 A1 | 4/2002 | Jung et al. |
| 2003/0152506 A1 | 8/2003 | Shibasaki et al. |
| 2006/0153764 A1 | 7/2006 | Schumacher et al. |
| 2006/0154994 A1 | 7/2006 | Schumacher et al. |
| 2006/0155042 A1* | 7/2006 | Schumacher ............ C08K 3/36 524/493 |
| 2006/0155052 A1 | 7/2006 | Schumacher et al. |
| 2010/0059704 A1 | 3/2010 | Davis et al. |
| 2011/0256030 A1* | 10/2011 | Barthel .................... B01J 19/26 422/129 |
| 2014/0030525 A1 | 1/2014 | Menzel et al. |
| 2021/0147245 A1 | 5/2021 | Sofin |

FOREIGN PATENT DOCUMENTS

| DE | 2620737 C2 | 7/1982 |
| DE | 19605672 C1 | 9/1997 |
| DE | 60133416 T2 | 4/2009 |
| DE | 102008054592 A1 | 6/2010 |
| DE | 102011017587 A1 | 10/2012 |
| EP | 0790213 A1 | 8/1997 |
| EP | 1693343 B1 | 9/2010 |
| EP | 1681265 B1 | 10/2010 |
| EP | 1681266 B1 | 11/2010 |
| EP | 1686093 B1 | 3/2011 |
| EP | 3580173 B1 | 12/2019 |
| WO | 2004048261 A2 | 6/2004 |

OTHER PUBLICATIONS

Gun'ko et al.: "Morphology and Surface Properties of Fumed Silicas", Journal of Colloid and Interface Science, vol. 289, No. 2, Sep. 15, 2005, pp. 427-445.

* cited by examiner

*Primary Examiner* — Colin W. Slifka
*Assistant Examiner* — Michael Forrest
(74) *Attorney, Agent, or Firm* — Brooks Kushman P.C.

(57) ABSTRACT

An economic process for producing high quality finely divided silicon dioxide from mixtures comprising economical silicon compounds without operational disturbances is characterized by using as an Si source mixture of at least two silicon compounds, at least one being carbon-containing and at least one being carbon-free, supplying a fuel gas and an oxygen-containing source, the molar C/Si ratio of this mixture being between 10/BET and 35/BET, and the molar H/Cl ratio of this mixture being between 0.45+(BET/600) and 0.95+(BET/600), with BET being the specific surface area of the pyrogenic silicon dioxide under production, introducing this mixture as the main flow into a reaction space and igniting and reacting it, and isolating the resulting solid.

16 Claims, No Drawings

METHOD FOR PRODUCING HIGHLY DISPERSED SILICON DIOXIDE

CROSS REFERENCE TO RELATED APPLICATIONS

This application is the U.S. National Phase of PCT Appln. No. PCT/EP2017/067720 filed Jul. 13, 2017, the disclosure of which is incorporated in its entirety by reference herein.

BACKGROUND OF THE INVENTION

1. Field of the Invention

The subject of the invention is a process for producing finely divided silicon dioxide which comprises
  supplying a mixture of at least two silicon compounds, at least one silicon compound being carbon-containing and at least one silicon compound being carbon-free,
  supplying a fuel gas,
  supplying an oxygen-containing source,
  the molar C/Si ratio of this mixture containing the silicon compounds, the fuel gas and the oxygen-containing source being between 10/BET and 35/BET and
  the molar H/Cl ratio of this mixture being between 0.45+(BET/600) and 0.95+(BET/600),
  where BET is the specific surface area of the pyrogenic silicon dioxide under production, measured by the BET method (corresponding to DIN ISO 9277),
  introducing this mixture as the main flow into a reaction space and igniting and reacting it, and
  isolating the resulting solid.

2. Description of the Related Art

Finely divided (highly disperse) silicon dioxide produced via flame reaction (pyrogenically) is also referred to by the term "fumed silica," and has been manufactured industrially for several decades. The process is described in DE 2620737 or EP 0 790 213, for example. Production takes place in a flame process wherein one or more volatile, silicon-containing compounds are reacted via hydrolysis and/or oxidation to given silicon dioxide. In this process, vaporizable or gaseous compounds containing silicon are fed into a flame which is formed by the burning of a water-forming fuel (usually $H_2$) and an oxygen-containing gas (usually air). After the reaction, the reaction products are cooled and the silicon dioxide powder entrained in the residual gases of the reaction (consisting of gaseous reaction products and unconsumed starting materials) is isolated. As and when required, the resultant, pulverulent, finely divided product is subsequently deacidified by removal of HCl adsorbed on its surface.

The silicon dioxide obtained constitutes a very fine powder having an aggregate size of less than 1 µm. The high specific surface area, which may be between 5 and 600 $m^2/g$, is considered to be one of the most important physical properties. It is customarily determined via $N_2$ adsorption and evaluation of the adsorption isotherms in accordance with the method of Brunauer, Emmet, and Teller (known as BET) in accordance with DIN ISO 9277.

However, pyrogenic silica produced industrially also includes, in small proportions (<0.1%) coarser particles (in the majority of cases, this is likewise $SiO_2$, albeit in a coarser, sintered form) which in many applications, even at very low levels, are disruptive. One problem often described, for example, is that of defects due to scratches when silicas are used in chemical-mechanical polishing and planarizing applications. When used in coating materials, resins, and silicones, this coarser fraction may perceptibly impair the processability (especially filterability), transparency and appearance of the surface. The coarse material present in fumed silica is often also termed "grit" and is determined customarily by the measurement method described in DIN EN ISO 787-18. This measurement method determines the mass fraction of particles which are retained by a sieve after a specific filtration process. In the present invention, filters with a mesh size of 40 µm were used for determining grit.

The literature describes numerous silicon-containing compounds which may serve as starting materials in the production of fumed silica. For instance, the patent applications EP 1 681 265 B1, EP 1 681 266 B1, EP 1 693 343 B1 and EP 1 686 093 B1 include a number of suitable representatives: silicon tetrachloride, trichlorosilane, dichlorosilane, monochlorosilane, methyltrichlorosilane, dimethyldichlorosilane, methyldichlorosilane, dibutyldichlorosilane, ethyltrichlorosilane, propyltrichlorosilane. For silicon tetrachloride (STC, $SiCl_4$), trichlorosilane (TCS, $SiCl_3H$), dichlorosilane (DCS, $SiCl_2H_2$), methyltrichlorosilane (MTCS, $CH_3SiCl_3$), and propyltrichlorosilane (PTCS, $C_3H_7SiCl_3$), the specifications also set out specific examples of the production of finely divided silicon dioxide.

DE 19605672 also discloses the use of organosilane compounds having the general formula $R_nCl_{3-n}Si-SiR_mCl_{3-m}$, where R is a hydrogen or an aliphatic or aromatic hydrocarbon radical and n and m are integers from 0 to 3.

Commercial production, however, uses predominantly silicon tetrachloride (STC) and methyltrichlorosilane (MTCS). The reasons for this are, first, the ready availability and the low costs of the raw materials, and, secondly, the high quality of the resultant product.

Fumed silica is most frequently produced from STC, which is obtained generally through the reaction of Si with HCl (Si+4 HCl=$SiCl_4$+$2H_2$). In the course of this reaction, however, byproducts may also be formed, such as considerable quantities of TCS in particular. Other possible byproducts include what are called high boilers (polychlorosilanes which boil at high temperature, such as hexachlorodisilane, pentachlorodisilane, and so on). Furthermore, a number of impurities present in the crude silicon (e.g. boron or aluminum) react with HCl to form chlorides, which are then present in the chlorosilane and, consequently, in the fumed silica as well. The aforementioned byproducts and impurities from the reaction of crude silicon with HCl disrupt the operation producing fumed silica and/or have an adverse influence on product quality. For these reasons, STC obtained by this pathway has to be laboriously purified prior to the reaction to give fumed silica in the flame reaction, and this perceptibly increases the cost of this raw material.

An alternative source of silicon tetrachloride is the preparation of high-purity polysilicon, since STC is produced in that case as a byproduct, in considerable quantities. This byproduct, however, generally includes perceptible amounts of low-boiling chlorosilanes such as TCS, DCS, and MCS (monochlorosilane, $SiClH_3$). To start with, these chlorosilanes are highly reactive and considerably disrupt the flame process. For instance, they may cause flashbacks, leading to the failure of the plant and hence to losses in production. Furthermore, these substances promote the formation of coarse-grain silicon dioxide particles, which in the majority of applications are unwanted.

The second starting material most important for the production of fumed silica is methyltrichlorosilane. This compound is formed in the synthesis of methylchlorosilanes by the Müller-Rochow process, which is aimed in particular at the synthesis of dimethyldichlorosilane (DMDCS, $Si(CH_3)_2Cl_2$). DMDCS is used as a principal raw material for the production of silicones. MTCS is available on favorable terms as an excess byproduct of this reaction, but exhibits significant disadvantages in the production of pyrogenic silicon dioxide. The oxidation of the methyl group releases a great quantity of energy, and so the stoichiometric reaction of MTCS would give rise to flame temperatures that are much too high, and hence to unacceptable product properties. To counteract this, the practice in industry when using MTCS is to add a great deal of additional air to the reaction, in order to dilute the energy source and thereby bring the flame temperature within the required range. In other words, the flame is greatly diluted by the addition of a very large quantity of air. This dilution significantly reduces the space-time yield of the production plant, to the detriment of the economics of producing fumed silica from MTCS.

SUMMARY OF THE INVENTION

An object of the invention is to provide an economic process for producing finely divided silicon dioxide in a flame reaction from mixtures comprising favorable silicon compounds, this process leading to high-quality products without any operational disruptions. Favorable silicon compounds in the context of this invention are identifiable either by being favorable in terms of price, i.e. cheap, and/or by being favorable from the standpoint of process engineering, being obtained, for example as a byproduct (e.g. unwanted byproduct or "waste") in another process; in other words, from the overall economic standpoint, they are favorable.

This and other objects are achieved by the process of the invention for producing finely divided silicon dioxide, this process being distinguished in
  using as an Si source, a mixture of at least two silicon compounds,
  at least one silicon compound being carbon-containing and at least one silicon compound being carbon-free,
  supplying a fuel gas,
  supplying an oxygen-containing source,
  the molar C/Si ratio of this mixture containing the silicon compounds, the fuel gas and the oxygen-containing source being between 10/BET and 35/BET and
  the molar H/Cl ratio of this mixture being between 0.45+(BET/600) and 0.95+(BET/600),
  where BET is the specific surface area of the pyrogenic silicon dioxide under production, measured by the BET method (corresponding to DIN ISO 9277),
  introducing this mixture as the main flow into a reaction space and igniting and reacting it, and
  isolating the resulting solid.

DETAILED DESCRIPTION OF THE PREFERRED EMBODIMENTS

Finely divided silicon dioxide is produced from silicon-containing compounds, which therefore represent a source of Si atoms and are referred to as an "Si source." In accordance with the invention, a mixture of at least two silicon compounds is used, comprising at least one carbon-containing and at least one carbon-free silicon compound (Si compound).

The carbon-containing Si compounds used are preferably methyltrichlorosilane (MTCS), methyldichlorosilane (MDCS), or a mixture of MTCS and MDCS.

The carbon-free Si compounds used are preferably silicon tetrachloride (STC), trichlorosilane (TCS), dichlorosilane (DCS), or a mixture of at least two of said compounds. A mixture of at least two of said compounds means that the mixture comprises at least two compounds selected from the group consisting of STC, TCS, and DCS.

Particular preference is given to the use, as an Si source, of mixtures of at least three silicon compounds.

Especially preferred for employment as an Si source are mixtures comprising silicon tetrachloride (STC), trichlorosilane (TCS), dichlorosilane (DCS), and methyltrichlorosilane (MTCS).

In accordance with the invention, the process takes place in the presence of a fuel gas or fuel gas mixture which also serves as a source of H atoms and optionally C atoms. Preferred fuel gases used are hydrogen, methane, natural gas, ethane, propane and/or other gaseous hydrocarbons, or mixtures thereof. Especially preferred for use as a fuel gas is hydrogen.

In accordance with the invention, an oxygen-containing source is supplied to the process which, on the one hand, serves together with the fuel gas for attainment of the required temperatures, and on the other hand is a source of O atoms. Preferred for use as an oxygen-containing source is oxygen, air, or mixtures thereof. Especially preferred for use as an oxygen-containing source is air. For the purposes of this invention, this air is also referred to as primary air (PL).

In accordance with the invention, the mixture comprising the silicon compounds, fuel gas, and the oxygen-containing source is referred to as the main flow.

In accordance with the invention, the molar ratio of carbon atoms per silicon atom (C/Si ratio) of the main flow is between 10/BET and 35/BET, where BET is the specific surface area of the finely divided silicon dioxide under production, measured by the BET method (according to DIN ISO 9277).

In accordance with the invention, the molar ratio of hydrogen atoms per chlorine atom (H/Cl ratio) of the main flow is between 0.45+(BET/600) and 0.95+(BET/600), where BET is the specific surface area of the finely divided silicon dioxide under production, measured by the BET method (according to DIN ISO 9277).

The molar ratio of carbon atoms per silicon atom, and of Hydrogen atoms per chlorine atom, respectively, is determined by dividing the amount of carbon or hydrogen atoms, respectively, that is present in all of the compounds used in the main flow, by the amount of silicon or chlorine atoms, respectively, that is present in all of the compounds of the main flow.

A particular advantage of the invention is that according to the desired specific surface area of the product (BET), it is possible to determine the mixing ratio in which the available starting compounds must preferably be used, or whether further or different starting compounds are required.

The main flow is introduced by means of a nozzle into a reaction space. There it is ignited and reacted, i.e., brought to reaction in the flame. In the context of this invention, the terms "reactor chamber", "combustion chamber of the reactor", and "reaction space" are used synonymously. Likewise used synonymously are the terms "nozzle", "burner", and "burner nozzle".

The resulting solid is subsequently isolated. This solid comprises finely divided silicon dioxide. Finely divided silicon dioxide in the sense of the invention is often also referred to as fumed silica, since it is obtained by means of a flame process and, owing to silanol groups on the particle surface, may be considered as an oxyacid of silicon.

In one advantageous and preferred embodiment of the invention, the flame is surrounded by secondary gas. Air is a preferred secondary gas. For the purposes of the invention, this air is also referred to by the term "secondary air" (SL).

The volume ratio of the secondary gas to the main flow is preferably between 0.01 to 0.4 and more preferably between 0.01 and 0.045. The ratio of the flow rates of the secondary gas and of the main flow is preferably kept between 0.1 and 0.8.

The surrounding of the flame by the secondary gas prevents backfire and reduces the disruptive deposition of the product on the nozzle. However, the secondary gas reduces the space-time yield of the process, since it does not participate directly in the reaction. It has proven favorable for the volume ratio of secondary gas and main flow to be kept within a certain ratio. It has surprisingly been observed, moreover, that the outflow velocity of the secondary gas has an influence on the flame reaction. Where this velocity is kept within a certain ratio to the outflow velocity of the main flow, it is possible to minimize the amount of secondary gas without losing its positive effect on the backfires and deposits. Moreover, the introduction of secondary gas leads to a reduction in the flame temperature, which has to be compensated by a greater amount of fuel gas. Consequently, as small an amount of secondary gas as possible is also advantageous for the saving of fuel gas.

The flow rate for the purposes of this invention refers to the rate at which a gas or gas mixture flows or is passed into a space; for example, at which a gas or gas mixture flows or is passed through the burner nozzle into the reaction space or into the combustion chamber of the reactor. It may be computed from the volume of the flowing gas or gas mixture and of the area of supply of the device (that is, for example, the cross-sectional area of the burner nozzle for the main flow, and the cross-sectional area of the ring surrounding the burner nozzle, for the secondary gas, respectively). More simply, for the purposes of this invention, the volumes of the gases in standard cubic meters per unit time are looked at for the purpose of calculating the flow rates. The change in the cross-sectional area owing to the thermal expansion of components is disregarded. Given that the flow rate is the rate at which a gas or gas mixture flows or is passed into a space, it is also referred to by the term "outflow velocity".

On introduction into the reaction space, the secondary gas ought preferably to have approximately the same temperature as the main flow introduced through the burner nozzle. It is therefore preferred for the secondary gas on introduction into the reaction space to have been heated to the temperature of the main flow. With particular preference this temperature is between 70 and 120° C.

After the flame reaction, the resultant solid is isolated. In the isolation of the solid formed, the gaseous substances are preferably removed. Following isolation, the resultant solid is preferably treated with hot gases. With particular preference, the hot gases are formed by the combustion of methane, hydrogen, or natural gas. With particular preference, no steam is admixed with the hot gases. The treatment preferably takes place at 400-600° C. In one particularly preferred embodiment, the required temperature is set by the addition of air to the combustion offgases.

The process of the invention is notable for the advantages that, when a certain composition of silicon compounds, characterized by the as-claimed C/Si and H/Cl ratios, is used in the process, that process not only runs without disruption and without flashbacks but also produces finely divided silicon dioxide which has a low grit fraction or coarse material fraction, and hence a high quality. At the same time, the process displays a good space-time yield, meaning that the process is economically relevant. It is possible, surprisingly, to use any desired Si sources, especially favorable (from the standpoints of price and/or of overall economics) Si sources such as, for example, a mixture of chlorosilanes from polysilicon production or MTCS from the Müller-Rochow synthesis, for producing finely divided silicon dioxide of high quality, provided the mixtures used include at least one carbon-containing and one carbon-free silicon compound and the main flow exhibits the as-claimed C/Si and H/Cl ratios.

A further advantage of the invention is the low level of consumption of fuel gas (which is evident, for example, from the low H/Cl ratio), to the benefit of the economics of the process.

The grit fraction or coarse fraction may be determined as described in the analytical methods. The coarse fraction in metal oxides is a key determinant of quality: a low coarse fraction is advantageous in many applications. Particularly in the context of use as a reinforcing filler in elastomers, in the rheology control of paints, varnishes, adhesives, and sealants, and in the area of the chemical-mechanical planarization of surfaces in the semiconductor sector, a low coarse fraction is an advantage. Particle dispersions of these kinds are also employed, for example, in the polishing of semiconductor elements, where large particles would result in scratches.

The space-time yield (S-T yield) is calculated from the amount of product ($SiO_2$ in g) per 1 $Nm^3$ of starting materials (silicon compounds+fuel gases+primary gas+secondary gas). The value of the S-T yield is preferably above 200-(BET/3) $g/Nm^3$, more preferably above 250-(BET/3) $g/Nm^3$, and most preferably above 300-(BET/3) $g/Nm^3$, where BET is the specific surface area of the fumed silicon dioxide under production, measured by the BET method (according to DIN ISO 9277).

In accordance with the invention, the process is a stable one, meaning that the reactor for producing finely divided silicon dioxide runs without disruption and without flashbacks. The main flow is ignited only in the combustion chamber of the reactor. Without disruption means that there is no ignition prior to entry into this reactor chamber. Nor are there any flashbacks from the burner nozzle into mixing elements, filters and/or compartments situated upstream of this burner nozzle.

For an aid to comprehension, the invention is elucidated, without being limited, by the inventive and comparative examples that are described below.

Analytical Methods and General Information

1. Determination of pH

The pH was determined in accordance with DIN EN 787-9, but using a 4% dispersion of the sample in water.

2. Determination of specific surface area

The specific surface area was determined by $N_2$ adsorption and evaluation of the adsorption isotherms in accordance with the method of Brunauer, Emmet, and Teller (known as BET) in accordance with DIN ISO 9277.

3. Determination of coarse particles content

The coarse particles content (also called grit or coarse fraction) was determined by the DIN EN ISO 787-18 method, using a sieve with a mesh size of 40 μm to separate and determine the fraction of coarse particles.

Unless otherwise indicated, all percentage figures are based on the mass/the weight.

The standard cubic meter (abbreviation $Nm^3$) is a unit which is used in process engineering for the standard volume of a gas. The definition of the standard cubic meter is laid down in DIN 1343 and in ISO 2533. A standard cubic meter is the quantity corresponding to one cubic meter of gas at a pressure of 1.01325 bar, an atmospheric humidity of 0% (dry gas), and a temperature of 0° C. (DIN 1343) or 15° C. (ISO 2533). In other words, under the specified conditions, a standard cubic meter of gas has a volume of 1 $m^3$, but in general, under differing conditions, has a different volume, which can be determined by means of specific conversions.

$Nm^3/h$ is the volume of gas or vapor supplied per unit hour.

EXAMPLES

In all cases, finely divided silicon dioxide was produced as described in the prior art (see, for example, EP 1 693 343 B1, EP 1 686 093 B1, EP 1 681 266 B1, EP 1 381 265 B1, or DE 26 20 737 C2), employing the following parameters and components:

A mixture of silicon compounds was vaporized, separately or jointly, and the vapor phase comprising the silicon compounds was mixed with hydrogen and air. The fractions of silicon compounds in the mixtures are listed in the individual examples, in percent by mass.

In the case of the respective compositions, all of the key components are listed. In industrial practice, it is not impossible that the mixtures also include minority fractions of other silicon compounds. These otherwise unspecified impurities, however, were always below 0.5 wt % and so have no effect on the production process.

The mixture A comprising the vaporized silicon compounds, fuel gas (hydrogen in all of the examples), and air (referred to as primary air, PL) was transferred as a main stream through a burner into a reactor chamber and, following ignition, was reacted in a flame reaction. Introduced around this mixture A into the reaction chamber was a secondary gas (air in all of the examples), which surrounded the flame. The secondary gas, air, was introduced in a controlled manner, with regulation both of the amount and of the outflow velocity. The calculation recited for the outflow velocity of the main flow through the burner and for the secondary air was performed under standard conditions (20° C., 1 atm), irrespective of the fact that the components were introduced at somewhat elevated temperatures (at 95° C. in all of the examples). After the reaction, the solid was isolated from gaseous substances and then deacidified with hot gases to a pH of between 4.0 and 5.0. The hot gases were formed by the combustion of natural gas with air.

Comparative Example C1

In this comparative example, the Si source used was a mixture of silanes, consisting of 90% STC, 5% TCS, and 5% DCS. 1000 kg/h of this silane mixture were vaporized and then mixed with 265 $Nm^3/h$ hydrogen and 850 $Nm^3/h$ primary air (PL) and, after initial ignition in a flame, were introduced into the reaction. The exit velocity of the main flow, consisting of the stated silane mixture, hydrogen, and primary air components, from the burner nozzle (v(HS)) was 44 m/s. Additionally, 600 $Nm^3/h$ secondary air (SL) with a velocity (v(SL)) of 40 m/s were passed into the combustion chamber of the reactor, and surrounded the flame.

The resulting silicon dioxide and the reaction gases were passed into a cooling system, where they were first cooled to below 200° C. Subsequently, the solid was isolated from the process gas by means of a cyclone or a filter. The silicon dioxide was subsequently treated with hot gases at a temperature of around 500° C. and so deacidified.

The process described was characterized by low stability. Combustion was disrupted by sporadic flashbacks, resulting in the failure of the plant. The product formed had a specific surface area of 150 $m^2/g$. Moreover, the pulverulent product obtained had a comparatively high coarse particles content of 0.02 wt %.

The experimental data and analytical data are listed in Table 1.

Comparative Example C2

In this comparative example, fumed silica was produced in the same way as for comparative example C1. The difference was the use as Si source of MTCS, which in an amount of 500 kg/h was mixed with 50 $Nm^3/h$ hydrogen and 1000 $Nm^3/h$ air.

The combustion of this mixture ran stably and resulted in a product which, for the same specific surface area of 150 $m^2/g$, had a lower grit fraction of 0.01%. The key disadvantage of this process regime according to the prior art was a low space-time yield. In this example, therefore, about the same total gas quantity (silanes+hydrogen+primary air+ secondary air) was processed as in comparative example C1, whereas the S-T yield was only about 60%.

The experimental data and analytical data are listed in Table 1.

Comparative Example C3

In this comparative example, fumed silica was produced in the same way as for comparative example C1. The difference was the use as Si source of a mixture of STC (68%) and MTCS (32%), which in an amount of 700 kg/h was mixed with 150 $Nm^3/h$ hydrogen and 1000 $Nm^3/h$ air.

It was possible to carry out stable combustion of the mixture. The process, however, had a comparatively low space-time yield. Moreover, the silicon dioxide produced, with the specific surface area of 300 $m^2/g$, had a relatively high grit fraction of 0.015%.

The experimental data and analytical data are listed in Table 1.

Comparative Example C4

In this comparative example, fumed silica was produced in the same way as for comparative example C1. The difference was the use as Si source of a mixture of STC (76%), TCS (19%), and MTCS (5%), which in an amount of 700 kg/h was mixed with 250 $Nm^3/h$ hydrogen and 900 $Nm^3/h$ air.

The reaction of the mixture described in the flame reaction produced fumed silica having the specific surface area of 150 $m^2/g$. The process, however, was marked by flame instability, leading continually to failure of the reaction as a result of flashbacks. Furthermore, the grit content determined for the product produced was comparatively high, at 0.015%.

9

The experimental data and analytical data are listed in Table 1.

Example 1 (Inventive)

In this example, a silane mixture from the preparation of polysilicon, consisting of STC, TCS, and DCS as for comparative example C1, was combined with the fourth component MTCS, to produce a new mixture having the following composition: STC 81%, TCS 4.5%, DCS 4.5%, MTCS 10%. For the production of pyrogenic silicon dioxide, 1000 kg/h of this new, four-component silane mixture were mixed, in the same way as for comparative example C1, together with 220 $Nm^3/h$ hydrogen and 850 $Nm^3/h$ primary air, and were reacted by ignition. The exit velocity of the reaction mixture from the nozzle was 43 m/s. Additionally, 600 $Nm^3/h$ secondary air were introduced at 40 m/s into the combustion chamber of the reactor, and surrounded the flame. Following isolation and deacidifcation, a product having a BET surface area of 150 $m^2/g$ was obtained. In contrast to comparative example C1, the combustion was undisrupted and produced fine powder having a low coarse particles fraction (grit content 0.008%). In contrast to comparative example C2, the reaction proceeded with a significantly higher space-time yield.

The experimental data and analytical data are listed in Table 2.

Example 2 (Inventive)

In this inventive example, the Si source used was a silane mixture of STC (68%), TCS (17%), and MTCS (15%). It was mixed in an amount of 1000 kg/h with hydrogen (210 $Nm^3/h$) and primary air (900 $Nm^3/h$) and reacted by ignition. The amount of secondary air surrounding the flame was 600 $Nm^3/h$.

The combustion ran stably and formed finely divided silicon dioxide having a specific surface area of 150 $m^2/g$. The finely pulverulent product had a low concentration of coarse particles, of 0.007%.

The experimental data and analytical data are listed in Table 2.

Example 3 (Inventive)

In this example, just as in comparative example C3, finely divided $SiO_2$ with a specific surface area of 300 $m^2/g$ was produced. The Si source used was the same silanes, albeit in a different mixing ratio: STC (90.6%), and MTCS (9.4%). The silane mixture in the amount of 800 kg/h was brought to reaction together with hydrogen (210 $Nm^3/h$) and primary air (900 $Nm^3/h$) by ignition.

As also in comparative example C3, the inventive process showed stable combustion. The process, however, yielded a perceptibly higher and therefore economically more advantageous space-time yield (157 as against 140 $g/Nm^3$). Furthermore, the silicon dioxide produced with the specific surface area of 300 $Nm^3/h$ was notable for a lower grit fraction of 0.007%.

The experimental data and analytical data are listed in Table 2.

Example 4 (Inventive)

In this inventive example, a silane mixture of STC (72%), TCS (18%), and methyldichlorosilane (10%) was used, and in the amount of 1000 kg/h was mixed together with hydrogen (190 $Nm^3/h$), and primary air (950 $Nm^3/h$) and brought to reaction by ignition.

Flame reaction of the mixture described produced fumed silica having a specific surface area of 150 $m^2/g$. The process did not show any instances of flame instability. A comparatively low grit content of 0.006% was determined for the product produced.

The experimental data and analytical data are listed in Table 2.

Example 5 (Inventive)

In this example, the same silane mixture as in Example 1 was used, i.e., the same components in the matching amount. In contradistinction to Example 1, the amount of secondary air was halved to 300 $Nm^3/h$. The amounts of hydrogen and primary air employed were 210 and 825 $Nm^3/h$, respectively.

The combustion ran stably, and fumed silica with the specific surface area of 150 $Nm^3/h$ was produced. As a result of the process regime optimized in relation to secondary air, it was possible to reduce the grit fraction in the product to 0.005%. The process was likewise notable for an even slightly better space-time yield.

The experimental data and analytical data are listed in Table 2.

Example 6 (Inventive)

This example was performed in the same way as for example 5; the starting materials were identical and were used in virtually the same amounts (see Table 2 below). As a difference, the introduction of the flame-surrounding secondary air was redesigned so that its outflow velocity was reduced to 10 m/s. It emerged that by means of this modified process regime, with a flame stability which continued to be good, it was possible to produce products having the same product surface area of 150 $m^2/g$, but with a very low grit content of 0.003%.

The experimental data and analytical data are listed in Table 2.

Example 7 (Inventive)

This example was carried out in the same way as for example 6. The amount of secondary air was reduced sharply to 30 $Nm^3/h$ and its introduction was adapted in such a way that its outflow velocity remained the same. The amounts of hydrogen and primary air used were 190 and 775 $Nm^3/h$, respectively.

The production of fumed silica by this process ran stably again and led to a product having a matching specific surface area of 150 $m^2/g$. The coarse particle fraction in this case was very low, at 0.002%.

The experimental data and analytical data are listed in Table 2.

TABLE 1

Overview of the data from the comparative examples

| | C1 | C2 | C3 | C4 |
|---|---|---|---|---|
| STC [kg/h] | 900 | — | 475 | 760 |
| TCS [kg/h] | 50 | — | — | 190 |
| DCS [kg/h] | 50 | — | — | — |
| MTCS [kg/h] | — | 500 | 225 | 50 |
| MDCS [kg/h] | — | — | — | — |

TABLE 1-continued

Overview of the data from the comparative examples

|  | C1 | C2 | C3 | C4 |
|---|---|---|---|---|
| $H_2$ [Nm³/h] | 265 | 50 | 150 | 250 |
| PL [Nm³/h] | 850 | 1000 | 1000 | 900 |
| SL [Nm³/h] | 600 | 600 | 600 | 600 |
| V'(SL)/V'(HS) | 0.48 | 0.53 | 0.48 | 0.47 |
| v(HS) [m/s] | 44 | 40 | 44 | 46 |
| v(SL) [m/s] | 40 | 40 | 40 | 40 |
| v(SL)/v(HS) | 0.90 | 1.01 | 0.91 | 0.88 |
| C/Si | 0.000 | 1.000 | 0.350 | 0.054 |
| H/Cl | 1.08 | 1.44 | 1.14 | 1.07 |
| BET [m²/g] | 150 | 150 | 300 | 150 |
| Grit content [%] | 0.020 | 0.010 | 0.015 | 0.015 |
| Combustion | unst. | st. | st. | unst. |
| $SiO_2$ production [kg/h] | 369 | 201 | 258 | 372 |
| ST yield | 199 | 116 | 140 | 197 |

TABLE 2

Overview of the data of inventive examples

| | Examples | | | | | | |
|---|---|---|---|---|---|---|---|
| | 1 | 2 | 3 | 4 | 5 | 6 | 7 |
| STC [kg/h] | 810 | 680 | 725 | 720 | 810 | 810 | 810 |
| TCS [kg/h] | 45 | 170 | — | 180 | 45 | 45 | 45 |
| DCS [kg/h] | 45 | — | — | — | 45 | 45 | 45 |
| MTCS [kg/h] | 100 | 150 | 75 | — | 100 | 100 | 100 |
| MDCS [kg/h] | — | — | — | 100 | — | — | — |
| $H_2$ [Nm³/h] | 220 | 210 | 210 | 190 | 210 | 205 | 190 |
| PL [Nm³/h] | 850 | 900 | 900 | 950 | 825 | 810 | 775 |
| SL [Nm³/h] | 600 | 600 | 600 | 600 | 300 | 300 | 30 |
| V'(SL)/V'(HS) | 0.52 | 0.50 | 0.48 | 0.52 | 0.27 | 0.27 | 0.03 |
| v(HS) [m/s] | 43 | 44 | 43 | 45 | 42 | 41 | 39 |
| v(SL) [m/s] | 40 | 40 | 40 | 40 | 20 | 10 | 10 |
| v(SL)/v(HS) | 0.94 | 0.90 | 0.93 | 0.88 | 0.48 | 0.24 | 0.26 |
| C/Si | 0.108 | 0.160 | 0.105 | 0.135 | 0.108 | 0.108 | 0.108 |
| H/Cl | 1.00 | 1.01 | 1.09 | 0.96 | 0.96 | 0.94 | 0.98 |
| BET [m²/g] | 150 | 150 | 300 | 150 | 150 | 150 | 150 |
| Grit content [wt %] | 0.008 | 0.007 | 0.007 | 0.006 | 0.005 | 0.003 | 0.002 |
| Combustion | St. | St. | St. | St. | St. | St. | St. |
| SiO2 production [kg/h] | 373 | 375 | 286 | 386 | 373 | 373 | 373 |
| ST yield | 206 | 203 | 157 | 205 | 253 | 256 | 329 |

Abbreviations Used in Tables 1 and 2

STC, silicon tetrachloride, $SiCl_4$
TCS, trichlorosilane, $SiCl_3H$
DCS, dichlorosilane, $SiCl_2H_2$
MTCS, methyltrichlorosilane, $CH_3SiCl_3$
MDCS, methyldichlorosilane, $Si(CH_3)Cl_2H$
PL, primary air
HS, main flow
v(HS), flow rates of the main flow through the burner nozzle into the reaction space or into the combustion chamber of the reactor
(Note: when calculating the flow rate of HS and SL, gas volumes and gas throughputs in standard cubic meters or Nm³/h, respectively, were used)
SL, secondary air
v(SL), flow rate of the flame-surrounding secondary air through the burner into the reaction space or into the combustion chamber of the reactor
V'(SL)/V'(HS), volume ratio of the secondary air to the main flow
(Note: for the volume, the symbol V' is used in the context of this invention, in order to avoid confusion with the symbol v for the rate/velocity.)
C/Si, molar ratio of carbon (C) to silicon atoms (Si) in the main flow
Since in accordance with the claims: C/Si=10/BET to 35/BET, this value must lie between 0.067 and 0.233 for BET=150 m²/g and between 0.033 and 0.117 for BET=300 m²/g.
H/Cl, molar ratio of hydrogen (H) to chlorine (Cl) in the main flow
Since in accordance with the claims: the H/Cl ratio in the main flow=0.45+(BET/600) to 0.95+(BET/600), this value must be between 0.70 and 1.20 for BET=150 m²/g and between 0.95 and 1.45 for BET=300 m²/g.
BET, specific surface area of the solid obtained, determined by the BET method
Grit content, fraction of coarse material
Combustion characteristics
a) unst., unstable, characterized by flashbacks, or
b) st., stable, no interferences during combustion, no flashback
ST yield, space-time yield calculated from the amount of product ($SiO_2$ in g/h) per 1 Nm³/h of starting materials (silanes+fuel gases+primary air+secondary gas)
The percentages are in wt %.

What is claimed is:

1. A process for producing finely divided silicon dioxide, comprising
   a) igniting and reacting, in a reaction space, a mainflow comprising:
      an Si source comprising at least two silicon compounds, at least one silicon compound being carbon-containing and at least one silicon compound being carbon-free,
      a fuel gas, and
      an oxygen-containing source,
   wherein the molar C/Si ratio of a mixture containing the silicon compounds, the fuel gas and the oxygen-containing source is between 10/BET and 35/BET, and the molar H/Cl ratio of the mixture is between 0.45+(BET/600) and 0.95+(BET/600), where BET is the specific surface area of the pyrogenic silicon dioxide under production, measured by the BET method according to DIN ISO 9277, and
   b) isolating a resulting solid.

2. The process of claim 1, wherein the carbon-containing silicon compounds comprise at least one of methyltrichlorosilane (MTCS) and methyldichlorosilane (MDCS).

3. The process of claim 1, wherein the carbon-free silicon compounds comprise at least one of silicon tetrachloride (STC), trichlorosilane (TCS), and dichlorosilane (DCS).

4. The process of claim 2, wherein the carbon-free silicon compounds comprise at least one of silicon tetrachloride (STC), trichlorosilane (TCS), and dichlorosilane (DCS).

5. The process of claim 1, wherein the Si source comprises a mixture of at least three silicon compounds.

6. The process of claim 1, wherein the Si source employed comprises a mixture comprising silicon tetrachloride, trichlorosilane, dichlorosilane, and methyltrichlorosilane.

7. The process of claim 1, wherein the fuel gas used comprises hydrogen.

8. The process of claim 1, wherein the oxygen-containing source used comprises air.

9. The process of claim 1, wherein a flame produced by the igniting and reacting is surrounded by secondary gas.

10. The process of claim 9, wherein the secondary gas comprises air.

11. The process of claim 9, wherein the volume ratio of secondary gas to the main flow is between 0.01 to 0.4.

12. The process of claim 10, wherein the volume ratio of secondary gas to the main flow is between 0.01 to 0.4.

13. The process of claim 9, wherein the ratio of the flow rates of the secondary gas to the main flow is between 0.1 and 0.8.

14. The process of claim 10, wherein the ratio of the flow rates of the secondary gas to the main flow is between 0.1 and 0.8.

15. The process of claim 9, wherein the secondary gas, on introduction into the reaction space, has been heated to the temperature of the main flow.

16. The process of claim 1, wherein the resulting isolated solid is treated with hot gases.

\* \* \* \* \*